United States Patent
Iguchi et al.

(10) Patent No.: US 10,655,017 B2
(45) Date of Patent: May 19, 2020

(54) PYRIMIDOQUINAZOLINE PIGMENT, METHOD FOR MANUFACTURING PYRIMIDOQUINAZOLINE PIGMENT, AND PIGMENT COLORANT

(71) Applicant: DAINICHISEIKA COLOR & CHEMICALS MFG. CO., LTD., Tokyo (JP)

(72) Inventors: Kazuki Iguchi, Tokyo (JP); Naomi Oguma, Tokyo (JP); Atsushi Nogami, Tokyo (JP); Shuwa Ozako, Tokyo (JP)

(73) Assignee: DAINICHISEIKA COLOR & CHEMICALS MFG. CO., LTD., Tokyo (JP)

( * ) Notice: Subject to any disclaimer, the term of this patent is extended or adjusted under 35 U.S.C. 154(b) by 0 days.

(21) Appl. No.: 16/332,899

(22) PCT Filed: May 12, 2017

(86) PCT No.: PCT/JP2017/017976
§ 371 (c)(1),
(2) Date: Mar. 13, 2019

(87) PCT Pub. No.: WO2018/061292
PCT Pub. Date: Apr. 5, 2018

(65) Prior Publication Data
US 2019/0233649 A1 Aug. 1, 2019

(30) Foreign Application Priority Data
Sep. 30, 2016 (JP) ................................. 2016-192744

(51) Int. Cl.
*C07D 487/22* (2006.01)
*C09B 57/00* (2006.01)

(52) U.S. Cl.
CPC .................................... *C09B 57/00* (2013.01)

(58) Field of Classification Search
CPC ............................. C07D 487/22; C09B 57/00
See application file for complete search history.

(56) References Cited

U.S. PATENT DOCUMENTS 4,132,851 A  1/1979 Yokoyama et al.

FOREIGN PATENT DOCUMENTS

| JP | 52-111923 | 9/1977 |
|---|---|---|
| JP | 53-110626 | 9/1978 |
| JP | 07-304985 | 11/1995 |
| JP | 07-309873 | 11/1995 |
| JP | 10-294178 | 11/1998 |
| JP | 2016-169315 | 9/2016 |
| JP | 2017-051098 | 3/2017 |

OTHER PUBLICATIONS

International Search Report, issued in the corresponding PCT application No. PCT/JP2017/017976, dated Aug. 1, 2017, 5 pages.
Rodolf Altiparrnakian, "Studies on Heterocyclic Colouring Matters Part III) 7a,14a-Diaza-7,7a,14,14a-tetrahydroquino [2,3-b]acridine-7,14-diones (5,7a,12,14a-Tetraaza-7,7a,14,14a-tetrahydropentacene-7,14-diones)", Helvetica Chimica Acta, Apr. 19, 1978, vol. 61, issue 3, pp. 1146-1157.

*Primary Examiner* — Emily A Bernhardt
(74) *Attorney, Agent, or Firm* — Hamre, Schumann, Mueller & Larson, P.C.

(57) ABSTRACT

The present invention provides a pyrimidoquinazoline pigment having a novel pyrimidine skeleton, the pyrimidoquinazoline pigment having excellent pigment properties, such as coloring power and durability, and excellent infrared reflectivity and a method for producing the pyrimidoquinazoline pigment, and a pigment colorant using the pyrimidoquinazoline pigment. The present invention relates to a pyrimidoquinazoline pigment represented by the following formula (1), wherein $R_1$ and $R_2$ each independently represent a benzene ring or a naphthalene ring optionally having a substituent, and a method for producing the pyrimidoquinazoline pigment. In addition, the present invention relates to a pigment colorant containing the pyrimidoquinazoline pigment.

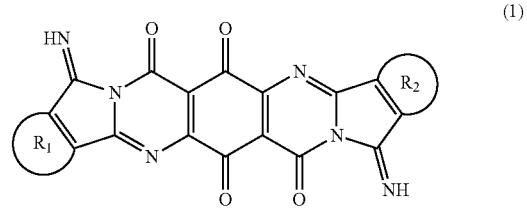

(1)

11 Claims, 2 Drawing Sheets

[Figure 1]
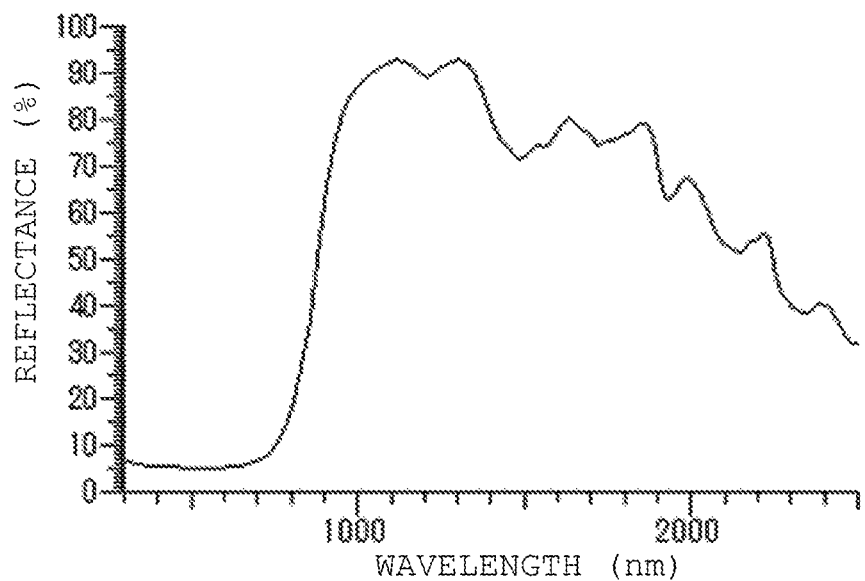
[Figure 2]
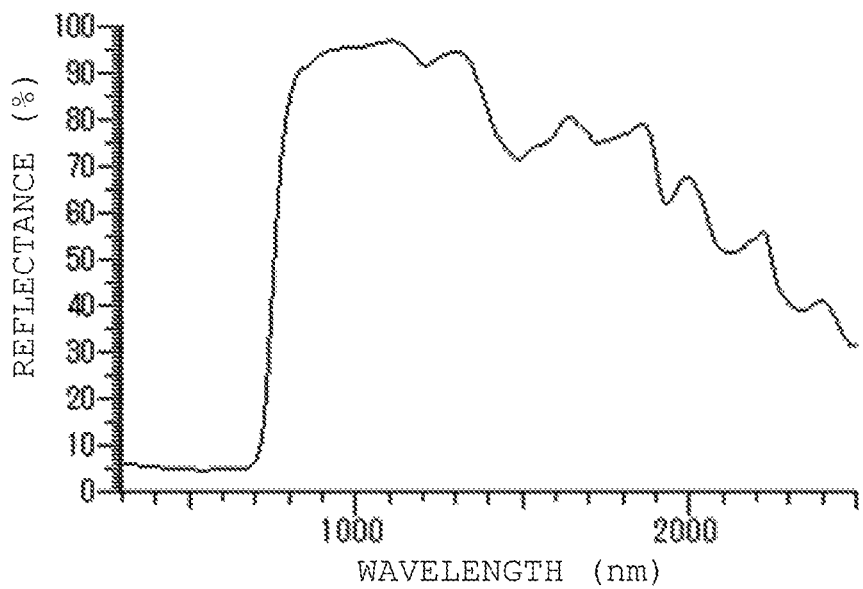

[Figure 3]
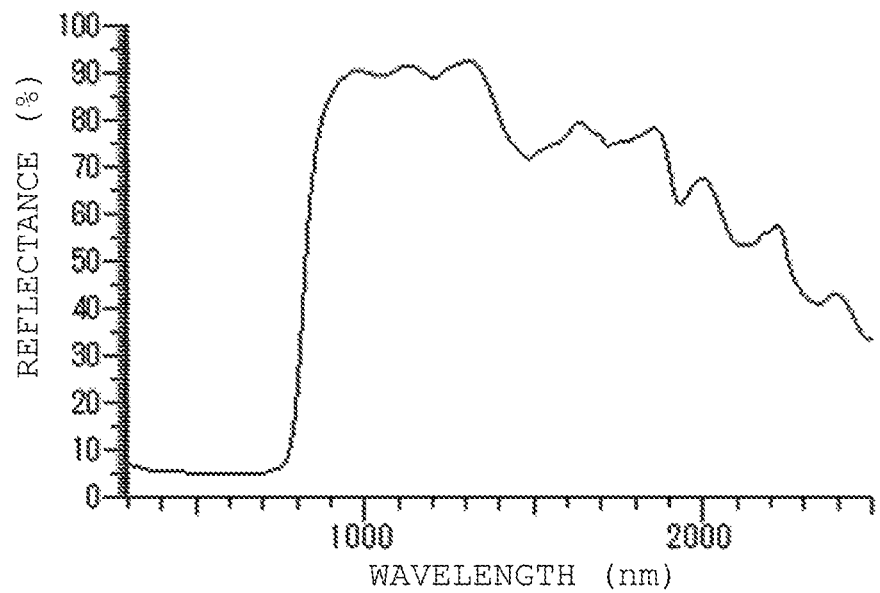
[Figure 4]
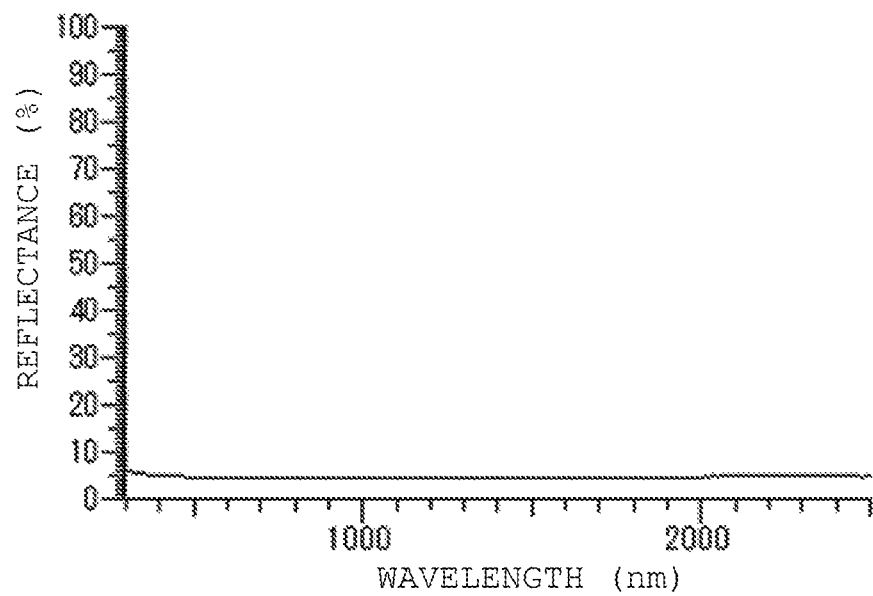

PYRIMIDOQUINAZOLINE PIGMENT, METHOD FOR MANUFACTURING PYRIMIDOQUINAZOLINE PIGMENT, AND PIGMENT COLORANT

TECHNICAL FIELD

The present invention relates to a pyrimidoquinazoline pigment and a method for producing the pyrimidoquinazoline pigment, and a pigment colorant using the pyrimidoquinazoline pigment.

BACKGROUND ART

A lot of compounds having a pyrimidine skeleton, such as azo compounds, azomethine compounds, and anthrapyrimidine compounds, which are useful as dyes/pigments are known (Patent Literatures 1 and 2). In addition, as compounds having a skeleton similar to the pyrimidine skeleton, barbituric acid-based dyes and pigments, such as Pigment Yellow 150 and Pigment Yellow 185, are known.

Incidentally, compounds having a pyrimidoquinazoline skeleton having two pyrimidine rings have long been known. For example, a compound having a predetermined pyrimidoquinazoline skeleton, the compound being useful as an anticancer agent, is known (Patent Literature 3). In addition, an organic electroluminescent element provided with a layer containing a compound having a predetermined pyrimidoquinazoline skeleton is proposed (Patent Literature 4).

CITATION LIST

Patent Literature

Patent Literature 1: Japanese Patent Laid-Open No. 2007-51098
Patent Literature 2: Japanese Patent Laid-Open No. 7-304985
Patent Literature 3: Japanese Patent Laid-Open No. 7-309873
Patent Literature 4: Japanese Patent Laid-Open No. 10-294178

SUMMARY OF INVENTION

Technical Problem

However, a compound having a pyrimidoquinazoline skeleton, the compound having excellent pigment properties, such as coloring power and durability, and excellent infrared reflectivity and being useful as a coloring material (pigment) has not been known so far.

The present invention has been completed in consideration of such problems of conventional techniques and intends to provide a novel pyrimidoquinazoline pigment having a pyrimidine skeleton, the pyrimidoquinazoline pigment having excellent pigment properties, such as coloring power and durability, and excellent infrared reflectivity. In addition, the present invention intends to provide a method for producing the pyrimidoquinazoline pigment and a pigment colorant using the pyrimidoquinazoline pigment.

Solution to Problem

That is, according to the present invention, a pyrimidoquinazoline pigment described below is provided.

[1] A pyrimidoquinazoline pigment represented by the following formula (1).

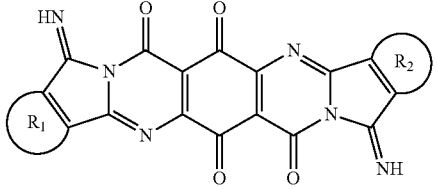

wherein $R_1$ and $R_2$ each independently represent a benzene ring or a naphthalene ring optionally having a substituent.

[2] The pyrimidoquinazoline pigment according to [1], represented by the following formula (1-1).

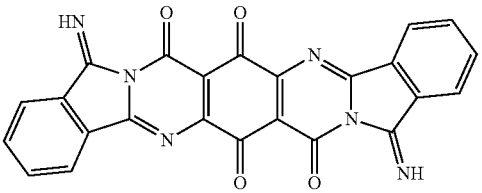

[3] The pyrimidoquinazoline pigment according to [1] or [2], having an average particle diameter of 10 to 200 nm.

In addition, according to the present invention, a method for producing the pyrimidoquinazoline pigment, the method described below, is provided.

[4] A method for producing the pyrimidoquinazoline pigment according to any one of [1] to [3], the method including a step of subjecting a compound represented by the following formula (3-1), a compound represented by the following formula (3-2), and a compound represented by the following formula (4) to a condensation reaction in an inert solvent

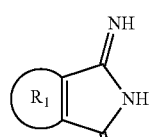

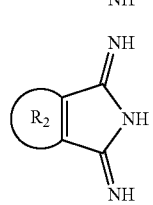

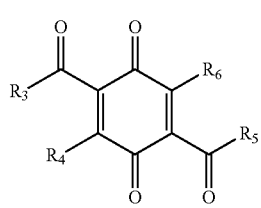

wherein $R_1$ and $R_2$ each independently represent a benzene ring or a naphthalene ring optionally having a substituent; and $R_3$, $R_4$, $R_5$, and $R_6$ each independently represent a hydrogen atom, an amino group, a halogen atom, or an alkoxy group optionally having a substituent.

[5] The method for producing the pyrimidoquinazoline pigment according to [4], wherein the inert solvent is a hydrophobic solvent.

[6] The method for producing the pyrimidoquinazoline pigment according to [4] or [5], further including a micronization step by a solvent salt milling method.

Further, according to the present invention, a pigment colorant described below is provided.

[7] A pigment colorant containing the pyrimidoquinazoline pigment according to any one of [1] to [3].

Advantageous Effects of Invention

According to the present invention, a novel pyrimidoquinazoline pigment having a pyrimidine skeleton, the pyrimidoquinazoline pigment having excellent pigment properties, such as coloring power and durability, and excellent infrared reflectivity, can be provided. In addition, according to the present invention, a method for producing the pyrimidoquinazoline pigment, and a pigment colorant using the pyrimidoquinazoline pigment can be provided.

BRIEF DESCRIPTION OF DRAWINGS

FIG. 1 is a visible-infrared absorption spectrum of a coating film formed with a pyrimidoquinazoline pigment (A) of Example 3.

FIG. 2 is a visible-infrared absorption spectrum of a coating film formed with a pigment (C) of Comparative Example 1.

FIG. 3 is a visible-infrared absorption spectrum of a coating film formed with a pigment (D) of Comparative Example 2.

FIG. 4 is a visible-infrared absorption spectrum of a coating film formed with a pigment (E) of Comparative Example 3.

DESCRIPTION OF EMBODIMENTS

<Pyrimidoquinazoline Pigment>

Hereinafter, embodiments according to the present invention will be described; however, the present invention is not limited to the following embodiments. A pyrimidoquinazoline pigment according to the present invention is a compound having a skeleton (structure) represented by the following formula (1). Hereinafter, details on the pyrimidoquinazoline pigment according to the present invention will be described.

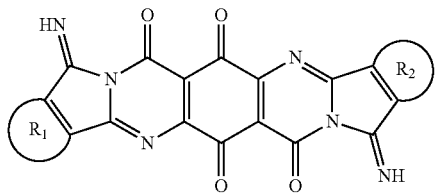

(1)

wherein $R_1$ and $R_2$ each independently represent a benzene ring or a naphthalene ring optionally having a substituent.

One of the important characteristics of the pyrimidoquinazoline pigment according to the present invention is that the pyrimidoquinazoline pigment is a compound having a structure represented by formula (1). The compound having a structure represented by formula (1) has pigment properties, such as coloring power and durability, which are equal to or more excellent than those of other condensed polycyclic pigments, and is suitable as a pigment. Further, the pyrimidoquinazoline pigment according to the present invention is a pigment exhibiting an excellent infrared reflectivity and is a black pigment having a high degree of blackness. It is to be noted that an isoindoline pigment or an isoindolinone pigment produced from a 1,3-diiminoisoindoline-based compound is a bright color pigment exhibiting yellow to orange color.

Specific examples of the pyrimidoquinazoline pigment according to the present invention include compounds represented by the following formulas (1-1) to (1-12).

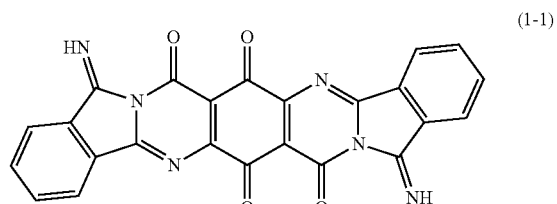

(1-1)

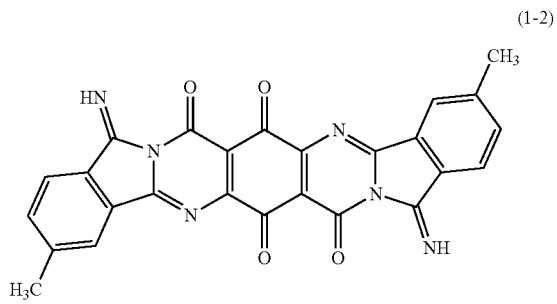

(1-2)

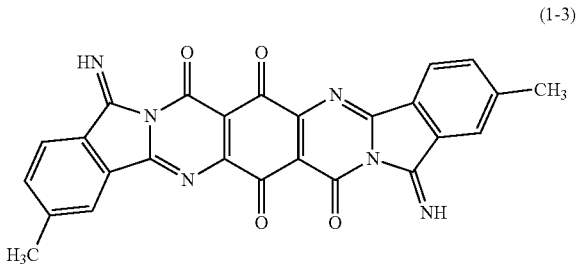

(1-3)

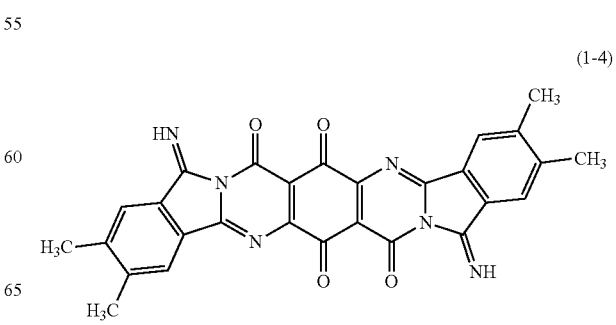

(1-4)

-continued (1-5)
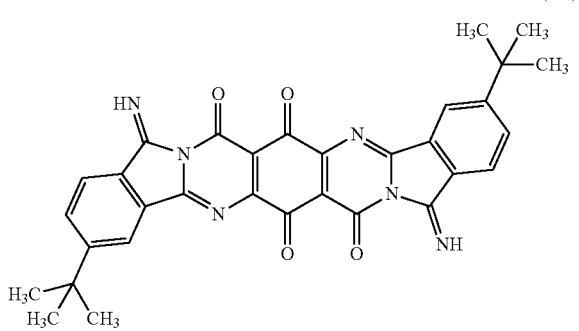

(1-6)
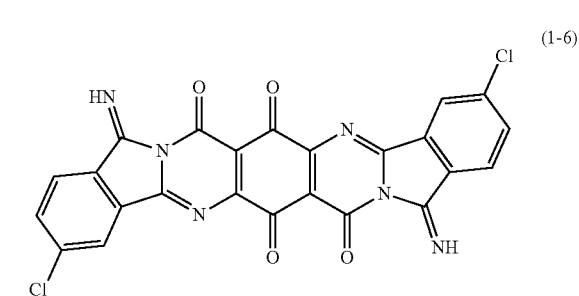

(1-7)
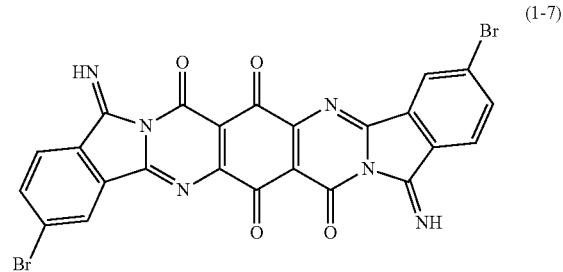

(1-8)
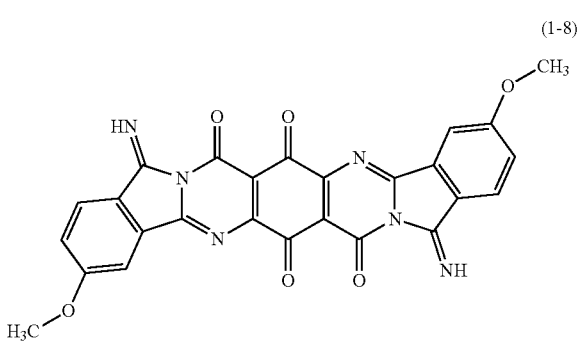

(1-9)
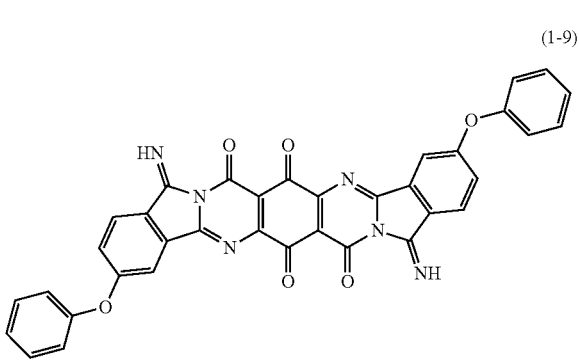

-continued (1-10)
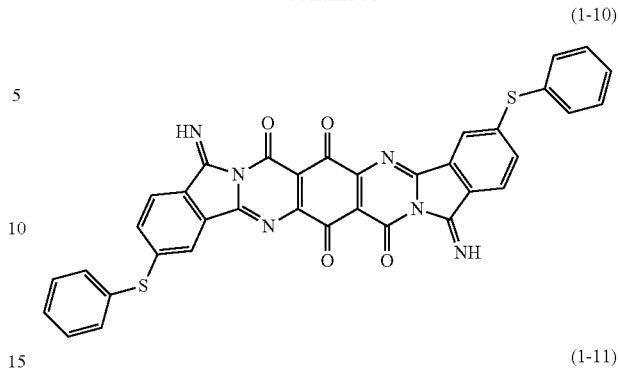

(1-11)

(1-12)
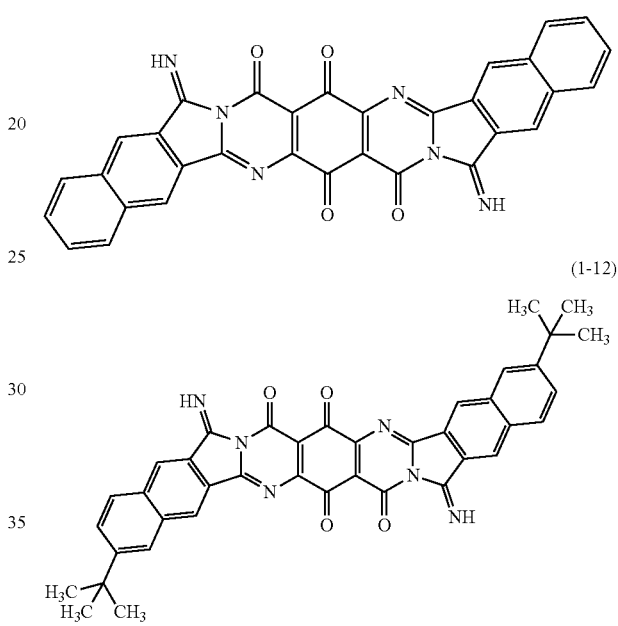

Among these, the pyrimidoquinazoline pigment represented by the following formula (1-1) is particularly preferable. With respect to the compound represented by the following formula (1-1), it is hard for the steric hindrance due to a substituent to occur, so that strong intermolecular/intramolecular hydrogen bond and π-π interaction can be formed. Therefore, the pyrimidoquinazoline pigment represented by the following formula (1-1) exhibits more excellent pigment properties.

(1-1)
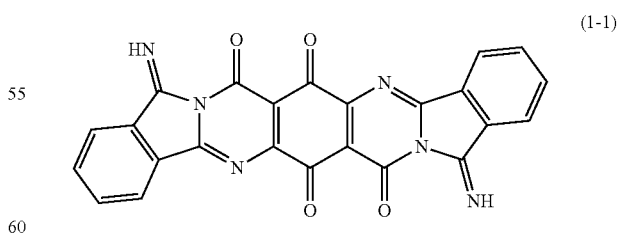

The pyrimidoquinazoline pigment preferably has an average particle diameter of 10 to 200 nm. In addition, the pyrimidoquinazoline pigment more preferably has an average particle diameter of 10 to 50 nm although the more preferred average particle diameter depends on the use to be applied. By setting the average particle diameter within the above-described range, the coloring power can be further improved, and therefore the pyrimidoquinazoline pigment is further suitable as a material for forming a thin film for which not only the degree of blackness but also the coloring power is required, such as, for example, a black matrix. It is to be noted that the "average particle diameter" in the present specification means a 50% particle diameter ($D_{50}$) based on a volume distribution. The $D_{50}$ of a pigment can be measured using, for example, a dynamic light scattering system particle diameter measurement apparatus.

<Method for Producing Pyrimidoquinazoline Pigment>

A method for producing the pyrimidoquinazoline pigment according to the present invention includes a step (reaction step) of subjecting a compound represented by the following formula (3-1), a compound represented by the following formula (3-2), and a compound represented by the following formula (4) to a condensation reaction in an inert solvent.

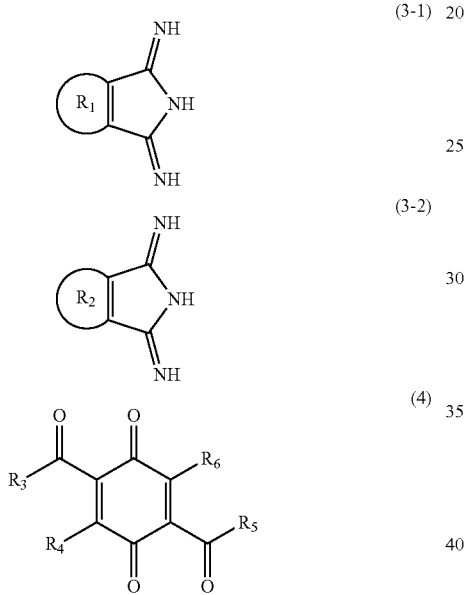

wherein $R_1$ and $R_2$ each independently represent a benzene ring or a naphthalene ring optionally having a substituent; and $R_3$, $R_4$, $R_5$, and $R_6$ each independently represent a hydrogen atom, an amino group, a halogen atom, or an alkoxy group optionally having a substituent.

When $R_1$ in formula (3-1) and $R_2$ in formula (3-2) are the same, a pyrimidoquinazoline pigment having a symmetric shape can be obtained. On the other hand, when $R_1$ in formula (3-1) and $R_2$ in formula (3-2) are not the same (different), an pyrimidoquinazoline pigment having an asymmetric shape can be obtained. That is, the pyrimidoquinazoline pigment having an asymmetric shape can be produced by using the compound represented by formula (3-1) and the compound represented by formula (3-2), each having a different structure, in combination.

A total of 2 to 6 mole equivalents of the compound represented by formula (3-1) and the compound represented by formula (3-2) based on the compound represented by formula (4) is preferably subjected to the condensation reaction, and more preferably a total of 4 to 6 mole equivalents thereof is subjected to the condensation reaction. Both of the compound represented by formula (3-1) and the compound represented by formula (3-2) are liable to undergo hydrolysis. Therefore, the yield can be improved by reacting preferably a total of 2 mole equivalents or more and more preferably a total of 4 mole equivalents or more of the compound represented by formula (3-1) and the compound represented by formula (3-2).

When the compound represented by formula (3-1), the compound represented by formula (3-2), and the compound represented by formula (4) are subjected to the condensation reaction, byproducts are produced. Both of the compound represented by formula (3-1) and the compound represented by formula (3-2) are compounds each having 2 types of amino groups which are reactive sites. Therefore, the byproducts are considered to be a compound represented by the following formula (1A), a compound represented by the following formula (1B), and the like. Even a mixture of the pyrimidoquinazoline pigment according to the present invention with these byproducts can be used. In addition, if necessary, the pyrimidoquinazoline pigment according to the present invention can also be used after performing purification and separation.

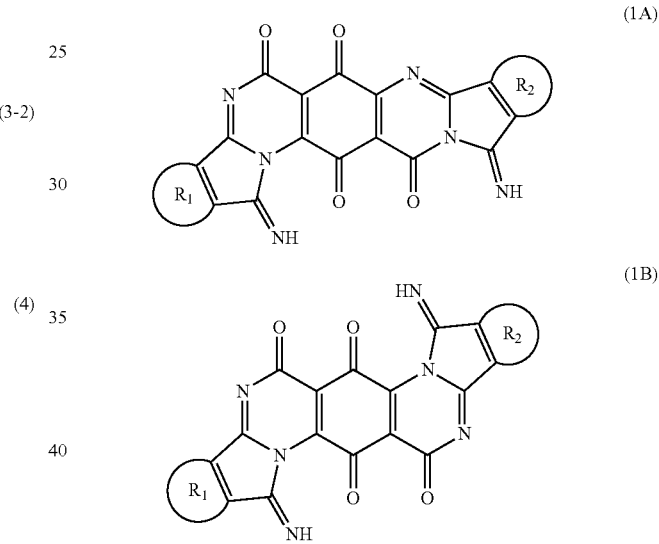

Specific examples of the compound represented by formula (3-1) and the compound represented by formula (3-2) include compounds represented by the following formulas (3a) to (3l).

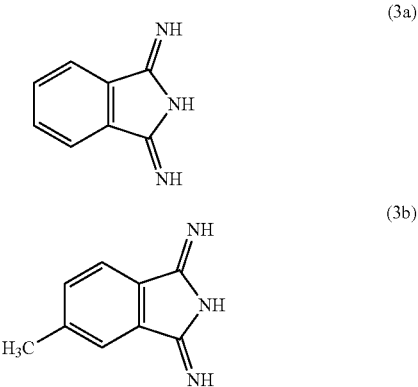

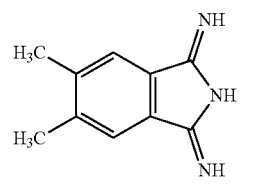
(3c)

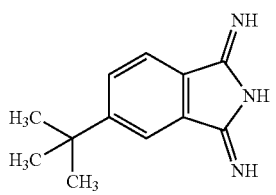
(3d)

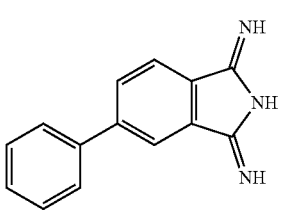
(3e)

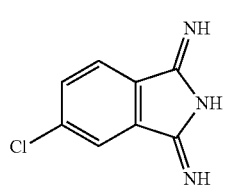
(3f)

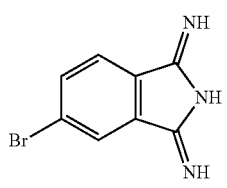
(3g)

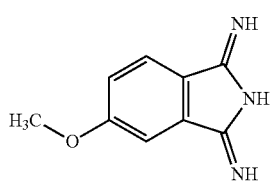
(3h)

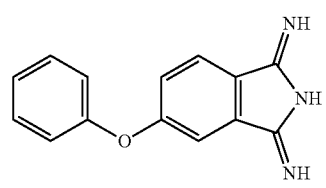
(3i)

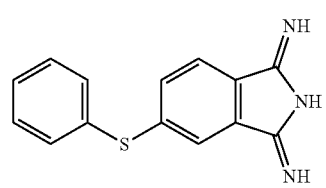
(3j)

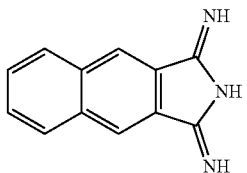
(3k)

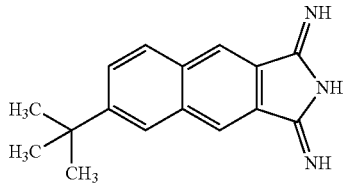
(3l)

The above-described compounds each having a diiminoisoindoline structure are liable to undergo hydrolysis, and therefore a hydrophobic solvent is preferably used as the inert solvent. Examples of the hydrophobic solvent include: aliphatic hydrocarbons such as n-hexane, n-heptane, cyclohexane, methylcyclohexane, ethylcyclohexane, and 2-methylpentane; and aromatic hydrocarbons such as toluene, xylene, chlorobenzene, dichlorobenzene, nitrobenzene, and chloronaphthalene. It is to be noted that solvents having a high dissolving power and having a high boiling point, such as chlorobenzene, dichlorobenzene, nitrobenzene, and chloronaphthalene, are preferably used because the reaction progresses smoothly.

The reaction temperature is preferably set to 100 to 140° C. When the reaction is performed at a temperature lower than 100° C., a mono-substituted product is produced much, and therefore the yield of the compound having an expected structure may be lowered in some cases. On the other hand, when the reaction is performed at a temperature higher than 140° C., there is a tendency that byproducts are produced much to lower the purity.

It is to be noted that abase is preferably coexisted as a catalyst because the yield is improved. Specific examples of the base include: inorganic bases (inorganic catalysts) such as sodium hydroxide, potassium hydroxide, sodium carbonate, and potassium carbonate; and organic bases (organic catalysts) such as triethylamine and diazabicycloundecene. The organic catalysts are preferably used because the reaction system becomes a homogeneous system.

Specific examples of the compound represented by formula (4) include compounds represented by the following formulas (4a) to (4e).

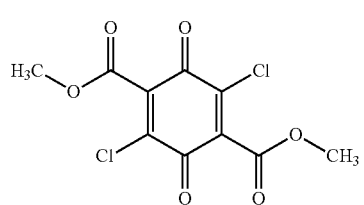
(4a)

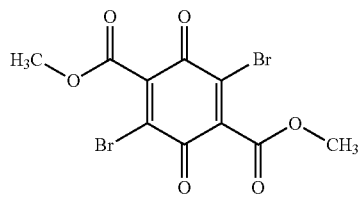
(4b)

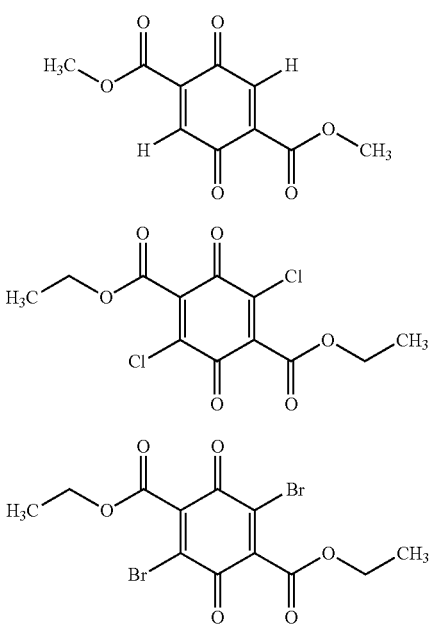

(4c)

(4d)

(4e)

As the compound represented by formula (4), a compound in which $R_3$ and $R_5$ are each an alkoxy group is preferable because the compound can be produced using an inexpensive succinyl succinic acid ester as a raw material. For example, a compound represented by the following formula (4a) wherein $R_3$ and $R_5$ are each a methoxy group and $R_4$ and $R_6$ are each a chlorin atom can be produced at a high yield and simply according to a conventionally known method (Reference: Synthesis, 2303-2306 (2008), by L. Hintermann, and K. Suzuki).

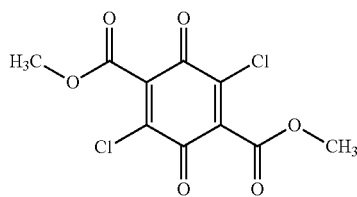

(4a)

It is preferable that the method for producing the pyrimidoquinazoline pigment according to the present invention further include a micronization step of micronizing a product (synthesized crude) obtained in the above-described reaction step. By micronizing the product obtained in the reaction step so as to have a desired particle diameter to prepare a pigment, the pyrimidoquinazoline pigment having a more improved degree of blackness and more improved coloring power and having a further preferred crystal form than the pyrimidoquinazoline pigment in a state immediately after the reaction can be obtained.

Examples of the method of micronizing the product obtained in the reaction step include: (1) a micronization method using a pigment grinder or a pigment disperser; (2) a solvent salt milling method of kneading and grinding the product with a water-soluble inorganic salt and a water-soluble organic solvent in a kneader; and the like. It is to be noted that examples of the above-described pigment grinder or pigment disperser include a ball mill, a sand mill, an attritor, a horizontal type continuous medium disperser, a kneader, a continuous single-screw kneader, a continuous twin-screw kneader, a three-roll mill, and an open roll continuous kneader. By any of the above-described methods, the average particle diameter of the pyrimidoquinazoline pigment can be adjusted within a predetermined range, and the crystal form of the pyrimidoquinazoline pigment can be controlled into a desired crystal form.

Among the above-described micronizing methods, the solvent salt milling method is preferable because a micronized pigment having a more uniform particle diameter can be obtained. Hereinafter, details on the solvent salt milling method will be described.

In the solvent salt milling method, a mixture obtained by adding a water-soluble inorganic salt as a grinding assistant and a water-soluble organic solvent to a pigment is kneaded and grinded. As the water-soluble inorganic salt, sodium chloride, sodium sulfate, or the like can be used. The amount of the water-soluble inorganic salt may be appropriately set in a range of, for example, 3 to 20 times (on a mass basis) the amount of the pigment according to the particle diameter of the micronized pigment intended to be obtained. As the water-soluble organic solvent, a solvent having a moderate viscosity, such as ethylene glycol, diethylene glycol, or polyethylene glycol, is preferably used. The temperature during kneading and grinding is preferably set to 20 to 120° C., and more preferably 60 to 120° C. Particularly when the kneading and grinding are performed under a temperature condition of 60° C. or higher, the crystal can be further grown.

After the kneading and grinding, an obtained ground product is added to dilute sulfuric acid or water to dissolve the water-soluble inorganic salt, and filtration and washing with water are then performed to obtain a paste (press cake) of the pigment after filtration. The obtained press cake may be, for example, (i) subjected to dispersion processing using a wet disperser; (ii) made into an oil-based colorant by a flashing system; (iii) made into a powder pigment by being crushed with a dry type crusher after hot air drying; and (iv) dispersed using any of various wet dispersers and kneaders; etc. That is, the obtained press cake can be processed into various types of colorants according to the use. It is to be noted that the obtained press cake is also preferably subjected to a resin treatment in water into an easily dispersible pigment or a processed pigment.

<Pigment Colorant>

A pigment colorant according to the present invention contains the above-described pyrimidoquinazoline pigment. For example, the above-described pyrimidoquinazoline pigment, when contained (dispersed) in a liquid dispersion medium or a solid dispersion medium, can be made into a pigment colorant being a colored composition. That is, a pigment component containing the pyrimidoquinazoline pigment may be dispersed in a liquid dispersion medium to make a composition in the form of liquid, or may be dispersed in a solid dispersion medium to make a solid composition according to the object of coloring, the use, and the use method.

As the pigment component which is dispersed in a dispersion medium such as a liquid dispersion medium or a solid dispersion medium, additional pigments other than the pyrimidoquinazoline pigments can be used. That is, in the dispersion medium, only the pyrimidoquinazoline pigment may be dispersed as the pigment component or a pigment component containing the pyrimidoquinazoline pigment and an additional pigment or pigments may be dispersed. As the additional pigment, chromatic color pigments, white pigments, other black pigments, extender pigments, and the like can be used. The additional pigments can be used singly or two or more of the additional pigments can be selected and used together to match the intended color. By dispersing the additional pigment or pigments together with the pyrimido-quinazoline pigment, a pigment colorant enabling dark color chromatic coloring, non-chromatic coloring, and black coloring can be obtained.

The content of the pyrimidoquinazoline pigment in the pigment colorant may be appropriately set according to the use and is not particularly limited. Specifically, the content of the pyrimidoquinazoline pigment in the pigment colorant may be about 1 to about 50% by mass based on the total mass of the pigment colorant.

EXAMPLES

Hereinafter, the present invention will be described in detail based on Examples, but the present invention is not limited to these Examples. It is to be noted that "part or parts" and "%" in Examples and Comparative Examples are each on a mass basis unless otherwise noted.

<Production of Pigment>

Example 1

To 230 parts of nitrobenzene, 15 parts of the compound represented by formula (4a), 31 parts of 1,3-diiminoisoindoline, and 22 parts of triethylamine were added, and a resultant mixture was heated at 110° C. for 4 hours. Hot filtration, washing with methanol, and washing with water were performed, and drying was then performed at 80° C. to obtain 14 parts of a black pyrimidoquinazoline pigment (A). The molecular weight of the obtained pyrimidoquinazoline pigment (A) was analyzed by mass analysis by MALDI and was found to be "446". From this result, it was found that the structure of the obtained pyrimidoquinazoline pigment (A) is represented by the following formula (1-1).

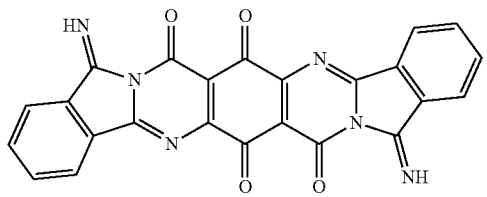

(1-1)

Example 2

Seventeen parts of a brown pyrimidoquinazoline pigment (B) was obtained in the same manner as in Example 1 described previously except that 55 parts of a compound represented by the following formula (3k-1) was used in place of 31 parts of 1,3-diiminoisoindoline. The molecular weight of the obtained pyrimidoquinazoline pigment (B) was analyzed by mass analysis by MALDI and was found to be "546". From this result, it was found that the structure of the obtained pyrimidoquinazoline pigment (B) is represented by the following formula (1-11).

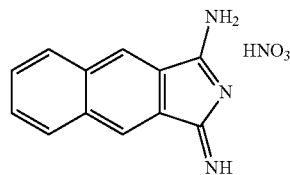

(3k-1)

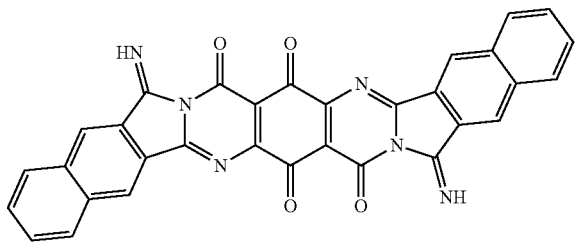

(1-11)

Example 3

In a kneader, 30 parts of the pyrimidoquinazoline pigment (A) obtained in Example 1, 195 parts of sodium chloride having an average particle diameter of 50 μm, and 40 parts of diethylene glycol were charged. A resultant mixture was preliminarily kneaded until a wetted lump was made, and a grinding treatment in which the wetted lump was kneaded at 60° C. for 3 hours was then performed to obtain a ground product. The ground product obtained was put into 1,000 parts of water, and a resultant mixture was stirred for 1 hour, then subjected to filtration, and washed with water. Drying was performed at 80° C. to obtain 28 parts of a micronized pyrimidoquinazoline pigment (A).

Comparative Examples 1 to 3

The following commercially available pigments were used as pigments (C), (D), and (E) of Comparative Examples 1 to 3.
  Comparative Example 1 (pigment (C)): trade name "Chromofine Black A1103" (manufactured by Dainichiseika Color & Chemicals Mfg., Co., Ltd.)
  Comparative Example 2 (pigment (D)): trade name "Lumogen Black FK 4280" (manufactured by BASF SE)
  Comparative Example 3 (pigment (E)): trade name "Carbon Black #45B" (manufactured by Mitsubishi Chemical Corporation)
<Paint Test>
Prepared pigments were each used to prepare a paint (deep color paint) by dispersing each pigment in each formulation described below for 90 minutes using a paint conditioner. The prepared paint was applied on white paper using an applicator (3-mill) and was then baked at 140° C. for 30 minutes to form a coating film.
  Pigment: 1.5 parts
  "Super Beckamine J-820", trade name (*1): 8.5 parts
  "Phthalkyd 133 to 60", trade name (*2): 17.0 parts
  Xylene/1-butanol (2/1 (mass ratio)) mixed solvent: 5.0 parts
    (*1) Butylated melamine resin (manufactured by DIC Corporation)
    (*2) Short oil length alkyd resin of palm oil (manufactured by Hitachi Chemical Company, Ltd.)

<Evaluation>

(Degree of Blackness)

Visible-infrared absorption spectra of the coating films formed in "Paint Test" described previously were measured using a spectrophotometer (trade name "U-4100", manufactured by Hitachi High-Technologies Corporation). The measured visible-infrared absorption spectra are shown in FIGS. 1 to 4. In addition, the CIE tristimulus values (X, Y, Z) were measured according to a usual method, and the degree of blackness of each coating film was calculated from the expression "degree of blackness=100×log(100/Y)". Results are shown in Table 1.

As shown in FIG. 2, the reflectance of the coating film formed with the pigment (C) of Comparative Example 1 sharply increases from around 680 nm toward the longer wavelength side. However, the rise of the reflectance is too steep to absorb light in a wavelength region of 400 to 700 nm, which is a visible light region, so that the degree of blackness is deficient. In addition, as shown in FIG. 3, the coating film formed with the pigment (D) of Comparative Example 2 absorbs light in the visible light region in a well-balanced manner; however, leakage of light in a wavelength region of around 500 to around 700 nm slightly exists, so that the degree of blackness is deficient. Further, it is found that as shown in FIG. 4, the coating film formed with the pigment (E) of Comparative Example 3 absorbs light in a wide wavelength region to 2500 nm and does not exhibit infrared reflectivity at all. In contrast, it is found that as shown in FIG. 1, the coating film formed with the pyrimidoquinazoline pigment (A) of Example 3 absorbs light in the visible light region in a well-balanced manner, and leakage of light in a wavelength region of around 500 to around 700 nm does not exist, so that the coating film formed with the pyrimidoquinazoline pigment (A) of Example 3 exhibits a high degree of blackness. Further, it is also found that the coating film formed with the pyrimidoquinazoline pigment (A) of Example 3 exhibits a favorable infrared reflectivity.

(Coloring Power)

Each deep color paint prepared in "Paint Test" described previously was diluted with a white paint containing titanium white (titanium oxide) so as to satisfy pigment: titanium white=1:20 (mass ratio) to prepare a light color paint. The prepared light color paint was applied on coated paper using an applicator (6-mill) and was then baked at 140° C. for 30 minutes to form a coating film. The coating film formed was observed by the naked eye, and the coloring power was evaluated according to the following criteria. Results are shown in Table 1.

Good: coloring power is favorable
Fair: coloring power is bad
Poor: lack of coloring power (Heat Resistance)

Thermogravimetry and differential thermal analysis (TG-DTA) were performed for each pigment to calculate the reduced rate at 400° C., and the heat resistance was evaluated according to the following criteria. Results are shown in Table 1.

Good: reduced rate at 400° C. is 5% or less
Fair: reduced rate at 400° C. is larger than 5% and 10% or less
Poor: reduced rate at 400° C. is larger than 10%

(Solvent Resistance)

Each pigment in an amount of 1 part was boiled in 10 parts of ethyl acetate to observe bleeding, and results of evaluating the solvent resistance according to the following criteria are shown in Table 1.

Good: bleeding does not occur
Fair: bleeding occurs a little
Poor: bleeding occurs remarkably

TABLE 1

| | Pigment | Average Particle diameter (nm) | Degree of blackness | Heat resistance | Solvent resistance | Infrared reflectivity | Coloring power |
|---|---|---|---|---|---|---|---|
| Example 1 | A | ~5,000 | 221 | Good | Good | Good | Fair |
| Example 3 | A | 50 | 239 | Good | Good | Good | Good |
| Comparative Example 1 | C | 1,000 | 223 | Poor | Fair | Good | Good |
| Comparative Example 2 | D | 50 | 223 | Fair | Fair | Good | Good |
| Comparative Example 3 | E | 30 | 236 | Good | Good | Poor | Good |

INDUSTRIAL APPLICABILITY

The pyrimidoquinazoline pigment according to the present invention is useful for uses, such as a black matrix, in which a high degree of blackness is required. In addition, the pyrimidoquinazoline pigment according to the present invention has a high light reflectivity in a near infrared region and therefore is useful as a heat ray reflective black pigment for which pigments such as carbon black are not suitable.

The invention claimed is:

1. A pyrimidoquinazoline pigment represented by following formula (1):

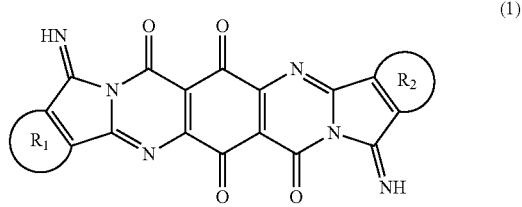

(1)

wherein $R_1$ and $R_2$ in the formula (1) each independently represent a benzene ring or a naphthalene ring optionally having a substituent, wherein the optional substituent for each of the $R_1$ and $R_2$ in the formula (1) is at least one group each independently selected from the group consisting of methyl, t-butyl, phenyl, chloro, bromo, methoxy, phenoxy, and thiophenoxy.

2. A pyrimidoquinazoline pigment represented by following formula (1-1):

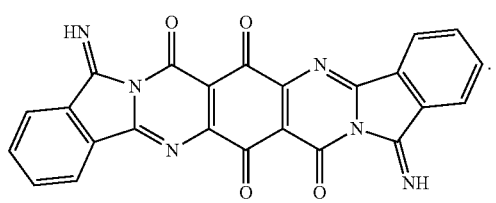

(1-1)

3. The pyrimidoquinazoline pigment according to claim 1, having an average particle diameter in a range from 10 to 200 nm.

4. A method for producing the pyrimidoquinazoline pigment according to claim 1,
the method comprising:
subjecting a compound represented by following formula (3-1), a compound represented by following formula (3-2), and a compound represented by following formula (4) to a condensation reaction in an inert solvent:

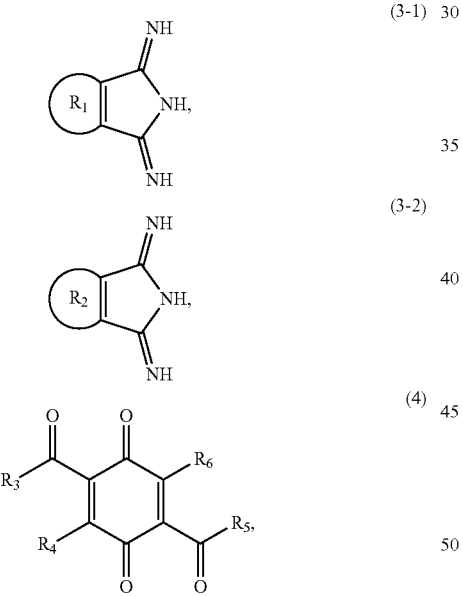

(3-1)

(3-2)

(4)

wherein $R_1$ in the formula (3-1) and $R_2$ in the formula (3-2) each independently represent a benzene ring or a naphthalene ring optionally having a substituent,
the optional substituent for each of the $R_1$ in the formula (3-1) and the $R_2$ in the formula (3-2) is at least one group each independently selected from the group consisting of methyl, t-butyl, phenyl, chloro, bromo, methoxy, phenoxy, and thiophenoxy, and
$R_3$, $R_4$, $R_5$, and $R_6$ in the formula (4) each independently is selected from the group consisting of hydrogen, amino, halogen, and alkoxy.

5. The method for producing the pyrimidoquinazoline pigment according to claim 4,
wherein the inert solvent is a hydrophobic solvent.

6. The method for producing the pyrimidoquinazoline pigment according to claim 4, further comprising micronization by a solvent salt milling method.

7. A pigment colorant comprising the pyrimidoquinazoline pigment according to claim 1.

8. The method for producing the pyrimidoquinazoline pigment according to claim 4,
wherein the $R_3$, the $R_4$, the $R_5$, and the $R_6$ each independently are selected from the group consisting of hydrogen, amino, chloro, bromo, methoxy, and ethoxy.

9. The pyrimidoquinazoline pigment according to claim 2, having an average particle diameter in a range from 10 to 200 nm.

10. A method for producing the pyrimidoquinazoline pigment according to claim 1,
the method comprising:
subjecting a compound represented by following formula (3-1), a compound represented by following formula (3-2), and a compound represented by following formula (4) to a condensation reaction in an inert solvent:

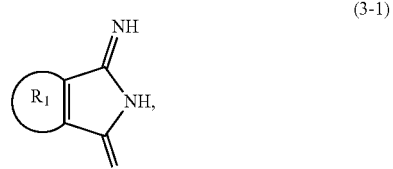

(3-1)

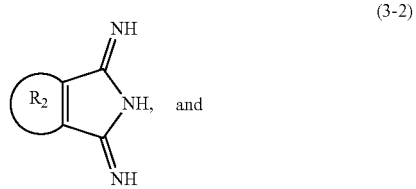

(3-2)

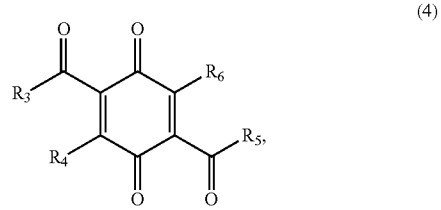

(4)

wherein $R_1$ in the formula (3-1) and $R_2$ in the formula (3-2) each independently represent a benzene ring or a naphthalene ring, and
$R_3$, $R_4$, $R_5$, and $R_6$ in the formula (4) each independently is selected from the group consisting of hydrogen, amino, halogen, and alkoxy.

11. A method for producing the pyrimidoquinazoline pigment according to claim 2,
the method comprising:
subjecting a compound represented by following formula (3-1), a compound represented by following formula (3-2), and a compound represented by following formula (4) to a condensation reaction in an inert solvent:

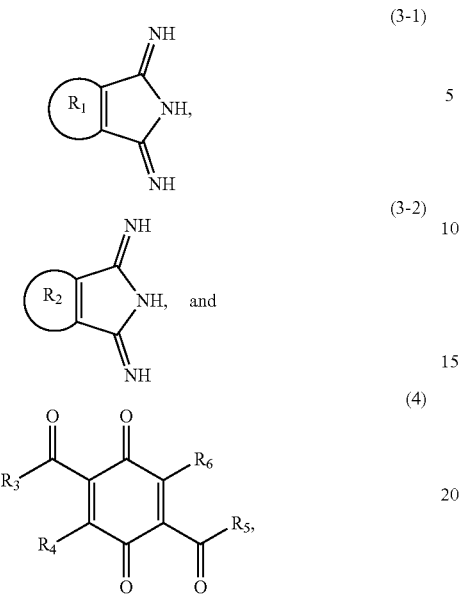
wherein $R_1$ in the formula (3-1) and $R_2$ in the formula (3-2) each independently represent a benzene, and
$R_3$, $R_4$, $R_5$, and $R_6$ in the formula (4) each independently is selected from the group consisting of hydrogen, amino, halogen, and alkoxy.
* * * * *